United States Patent
Churchyard

(10) Patent No.: US 6,959,418 B1
(45) Date of Patent: Oct. 25, 2005

(54) SYSTEM AND METHOD FOR FACILITATING EDITING OF CODES SUCH AS HTML AND XML CODES BY SCRIPTS

(75) Inventor: Peter Churchyard, Mt. Airy, MD (US)

(73) Assignee: Networks Associates Technology, Inc., Santa Clara, CA (US)

( * ) Notice: Subject to any disclaimer, the term of this patent is extended or adjusted under 35 U.S.C. 154(b) by 813 days.

(21) Appl. No.: 09/894,693

(22) Filed: Jun. 27, 2001

(51) Int. Cl.$^7$ ............................................. G06F 17/24
(52) U.S. Cl. ..................................................... 715/513
(58) Field of Search ..................... 715/513; 707/102, 707/101

(56) References Cited

U.S. PATENT DOCUMENTS

| | | | | |
|---|---|---|---|---|
| 5,487,165 | A | * | 1/1996 | Tsay et al. ................... 707/102 |
| 5,583,762 | A | * | 12/1996 | Shafer ......................... 715/513 |
| 6,105,044 | A | * | 8/2000 | DeRose et al. .............. 715/514 |
| 6,502,101 | B1 | * | 12/2002 | Verprauskus et al. ....... 707/101 |
| 6,581,062 | B1 | * | 6/2003 | Draper et al. ................ 715/513 |
| 6,658,624 | B1 | * | 12/2003 | Savitzky et al. ............. 715/513 |
| 6,763,499 | B1 | * | 7/2004 | Friedman et al. ........... 715/513 |
| 2003/0005410 | A1 | * | 1/2003 | Harless ........................ 717/114 |

OTHER PUBLICATIONS

Deutsch et al., "Storing Semistructured Data with STORED" ACM SIGMOD Record, Proceedings of the 1999 ACM SIGMOD International Conference on Management of Data, Jun. 1999, vol. 28 Issue 2.*

Shanmugasundaram, et al, "Relational Databases for Querying XML Documents: Limitations and Opportunities" Proc. of VLBD, pp. 302-314, 1999.*

Lamb, Linda et al., Learning the vi Editor, 6$^{th}$ Edition; Section 8.5—"Enhanced Tags," Section 9. 8—"Improvements for Editing," and Section 10. 8—"Improved Editing Facilities" (O'Reilly & Associates, ©1998).*

Rawlins, Michael C., Using XML with Legacy Business Applications; Chapter 8—"XML to Flat File: Detail Design" (Addison Wesley, © Aug., 2003).*

* cited by examiner

Primary Examiner—Heather R. Herndon
Assistant Examiner—Doug Hutton
(74) Attorney, Agent, or Firm—Zilka-Kotab, PC; Christopher J. Hamaty

(57) ABSTRACT

The method for reformatting a tag-based code containing at least one corresponding beginning and end tag pair generally includes locating each beginning and end tag of the tag-based code, separating distinct tags and data associated therewith into separate lines, maintaining a tag structure state machine for determining a tag structure corresponding to each line, and delineating each line with a representation of a tag structure corresponding to the line based on the state-machine of the tag structure.

14 Claims, 4 Drawing Sheets

| Line | Resulting Modified Code | | LIFO Tag Stack |
|---|---|---|---|
| 1 | tag1 | = <tag1>tag1 data | tag1 |
| 2 | tag1 tag2 | = <tag2>tag2 data</tag2> | tag1, tag2 |
| 3 | tag1 | = more tag1 data | tag1 |
| 4 | tag1 tag3 | = <tag3>tag3 data | tag1, tag3 |
| 5 | tag1 tag3 tag4 | = <tag4>tag4 data</tag4> | tag1, tag3, tag4 |
| 6 | tag1 tag3 | = more tag3 data</tag3> | tag1, tag3 |
| 7 | tag1 | = yet more tag1 data</tag1> | tag1 |

| Example of an Original Tag-Based Code |
|---|
| <tag1>tag1 data<tag2>tag2 data</tag2>more tag1 data<tag3>tag3 data <tag4>tag4 data</tag4>more tag3 data</tag3>yet more tag1 data</tag1> |

FIG. 3A

| Line | Resulting Modified Code | | LIFO Tag Stack |
|---|---|---|---|
| 1 | tag1 | = <tag1>tag1 data | tag1 |
| 2 | tag1_tag2 | = <tag2>tag2 data</tag2> | tag1, tag2 |
| 3 | tag1 | = more tag1 data | tag1 |
| 4 | tag1_tag3 | = <tag3>tag3 data | tag1, tag3 |
| 5 | tag1_tag3_tag4 | = <tag4>tag4 data</tag4> | tag1, tag3, tag4 |
| 6 | tag1_tag3 | = more tag3 data</tag3> | tag1, tag3 |
| 7 | tag1 | = yet more tag1 data</tag1> | tag1 |

FIG. 3B

SYSTEM AND METHOD FOR FACILITATING EDITING OF CODES SUCH AS HTML AND XML CODES BY SCRIPTS

BACKGROUND OF THE INVENTION

1. Field of the Invention

The present invention relates generally to a system and method for facilitating editing of codes such as HTML and XML codes by scripts. More specifically, a system and method for facilitating examining and/or editing of tag-based code such as HTML and XML codes by scripts are disclosed.

2. Description of Related Art

Tag-based software languages such as HTML and XML utilize tags to delineate beginning and end of sections of a piece of code. Examples of begin and end tag pairs in HTML include "<HEAD>" and "</HEAD>," "<TITLE>" and "<TITLE>," and "<CENTER>" and "</CENTER>." Such begin and end tag pairs thus designate the beginning and end of specific sections and/or formatting within the piece of code.

Tag-based files are often utilized for storing and displaying various data such as employee records data. In order to maintain and update such data, records may need to be added, edited, or deleted. Automatic editing of such tag-based files is desired as manually editing such records within the tag-based file can be tedious, time-consuming, and error-prone.

In order to edit or otherwise manipulate such tag-based code, it is desirable to utilize existing scripts or script languages. There are many existing scripts and script languages designed for easy manipulation and editing of codes for various purposes. However, such script languages and script commands are typically line-based. For example, in Unix, the script command "grep" performs a search for a specific phrase or string in a particular file and prints all lines in the file that contain the matching string.

In contrast, tag-based languages are not line-based and an entire piece of code such as an HTML file may be contained within a single line or any suitable number of lines. In other words, any number of beginning and end tags or tag pairs may be contained in any number of suitable lines. As is evident, it would be difficult to utilize script languages that are often line-based to locate beginning and end tags in order to process and edit only the desired data between the beginning and end tags.

Therefore, it is desirable to provide a system and a method to facilitate examining and/or editing of tag-based code using script languages.

SUMMARY OF THE INVENTION

A system and method for facilitating examining and/or editing of tag-based code such as HTML and XML codes by scripts are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

According to a preferred embodiment, a method for reformatting a tag-based code containing at least one corresponding beginning and end tag pair generally includes locating each beginning and end tag of the tag-based code, separating distinct tags and data associated therewith into separate lines, maintaining a tag structure state machine for determining a tag structure corresponding to each line, and delineating each line with a representation of a tag structure corresponding to the line based on the state-machine of the tag structure. The tag structure state machine may be a LIFO tag stack into which each beginning tag is inserted upon locating the beginning tag and removed upon locating a corresponding end tag. The delineating may be in the form of a prefix. The separating of distinct tags and data associated therewith into separate lines may generally include placing each beginning tag and any data associated therewith prior to a next beginning tag, if any, on a new line, placing each end tag on a same line as any data associated therewith immediate before the end tag, and initiating a new line each time an end tag is processed if the end of the file is not yet reached.

According to another preferred embodiment, a method for processing a tag-based code may include reformatting the tag-based code and utilizing script tools to process the reformatted code. The method may optionally further include stripping each line of the processed and reformatted code of the delineation representing the tag structure corresponding to the line.

In yet another embodiment, a computer program product for reformatting a tag-based code containing at least one corresponding beginning and end tag pair generally comprises computer code that locates each beginning and end tag of the tag-based code, computer code that separates distinct tags and data associated therewith into separate lines, computer code that maintains a tag structure state machine for determining a tag structure corresponding to each line, computer code that delineates each line with a representation of a tag structure corresponding to the line based on the state-machine of the tag structure, and a computer readable medium that stores the computer codes.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 3A–3B are tables illustrating an exemplary tag-based code and a code modified utilizing the process of FIG. 2;

DESCRIPTION OF SPECIFIC EMBODIMENTS

A system and method for facilitating examining and/or editing of tag-based code such as HTML and XML codes by scripts are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

It is to be understood that although the systems and methods are generally described herein with reference to HTML and XML code, the systems and methods may be applicable to any other tag- or marker-based languages that utilize beginning and end concepts. For example, in C programming language, functions are delineated by an open brace ("{") and a corresponding end brace ("}"). In other words, the systems and methods described herein are well suited for generating structured grouping from any original code that utilize beginning and end concepts. Furthermore, the uses of such a new code in a structured grouping are described herein in terms of, but are not limited to, script tools.

Figure 1:
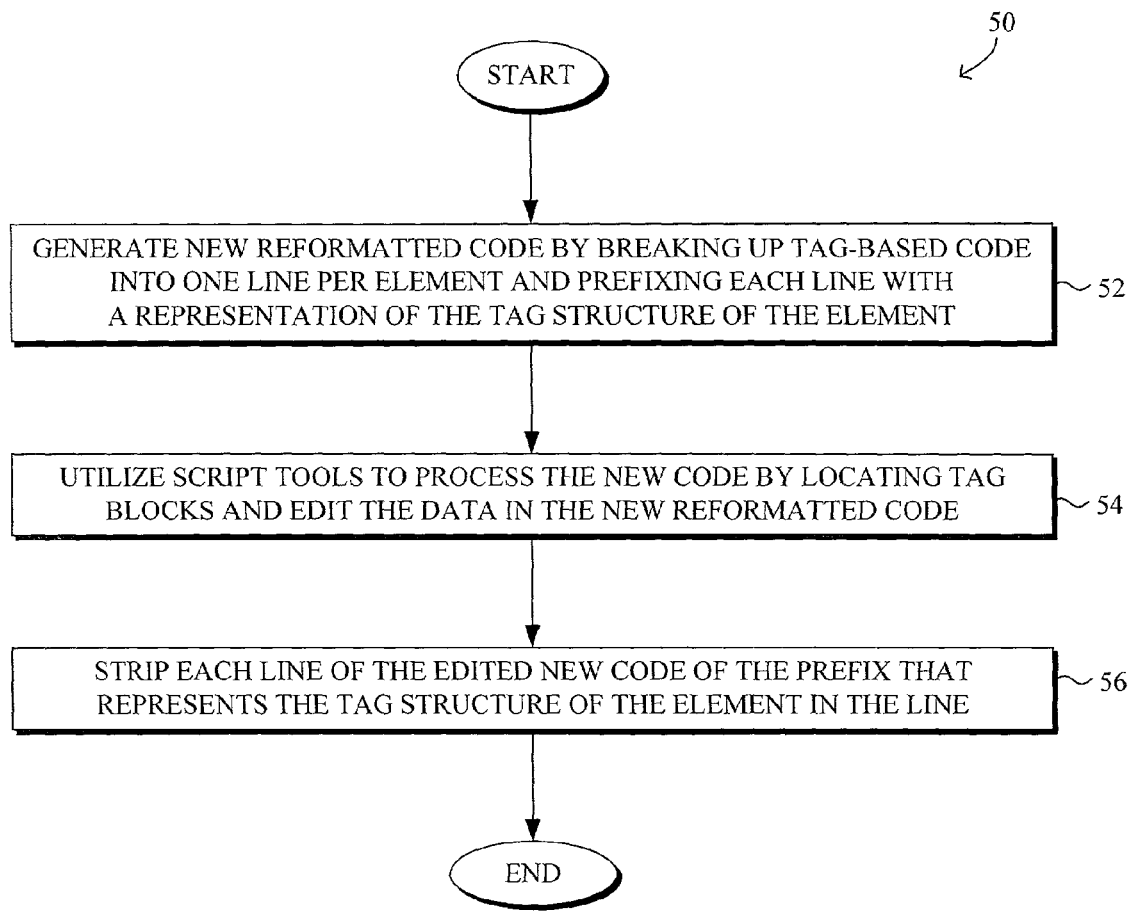
FIG. 1 is a flowchart illustrating a process for processing and editing tag-based code using scripts.

FIG. 1 is a flowchart illustrating a process 50 for processing and editing tag-based code using scripts. At step 52, new reformatted code is generated from a tag- or marker-based code. The new code is generally a line-based structured grouping of the elements of the original code. In particular, the tag-based code is broken up, as needed, into one line per element. In addition, each line includes a representation of the tag structure of the element contained in the line, preferably as a prefix.

For example, an element "<tag1>tag 1 data</tag1>" in which "<tag1>" is a beginning marker or tag, "</tag1>" is a corresponding or matching end tag, and "tag 1 data" is the tag-delineated data may be culled from an original tag-based code and placed in its own line in the new code. In addition, the line may be prefixed with a representation of the tag structure of the element, e.g., "tag1=<tag1>tag 1 data</tag1>" or "tag1: <tag1>tag 1 data</tag1>."

As is evident, any other suitable method for generating new reformatted line-based code from an original tag-based code such that the new code is organized into structured groupings of elements may be utilized. For example, although not preferred, the representation of the tag structure of the element may reside in a separate line by itself and followed by a line containing the element itself.

At step 54, script tools may be utilized to process the new code. The script tools preferably locate tag blocks or groupings using the representation of the tag structure for each element, such as contained in each line. Once the tag blocks or groups are located, the script tools may further be utilized to edit or otherwise manipulate data contained in the new code.

At step 56, the edited new code may optionally be stripped of the representation of the tag structure for each element. Although this is typically preferred, this is an optional step as the representation of the tag structure may itself form a valid part of the tag-based code. In other words, the representation of the tag structure may be valid code, such as a comment or a dummy code, in the original tag-based language such as XML, HTML, or C.

Figure 2:
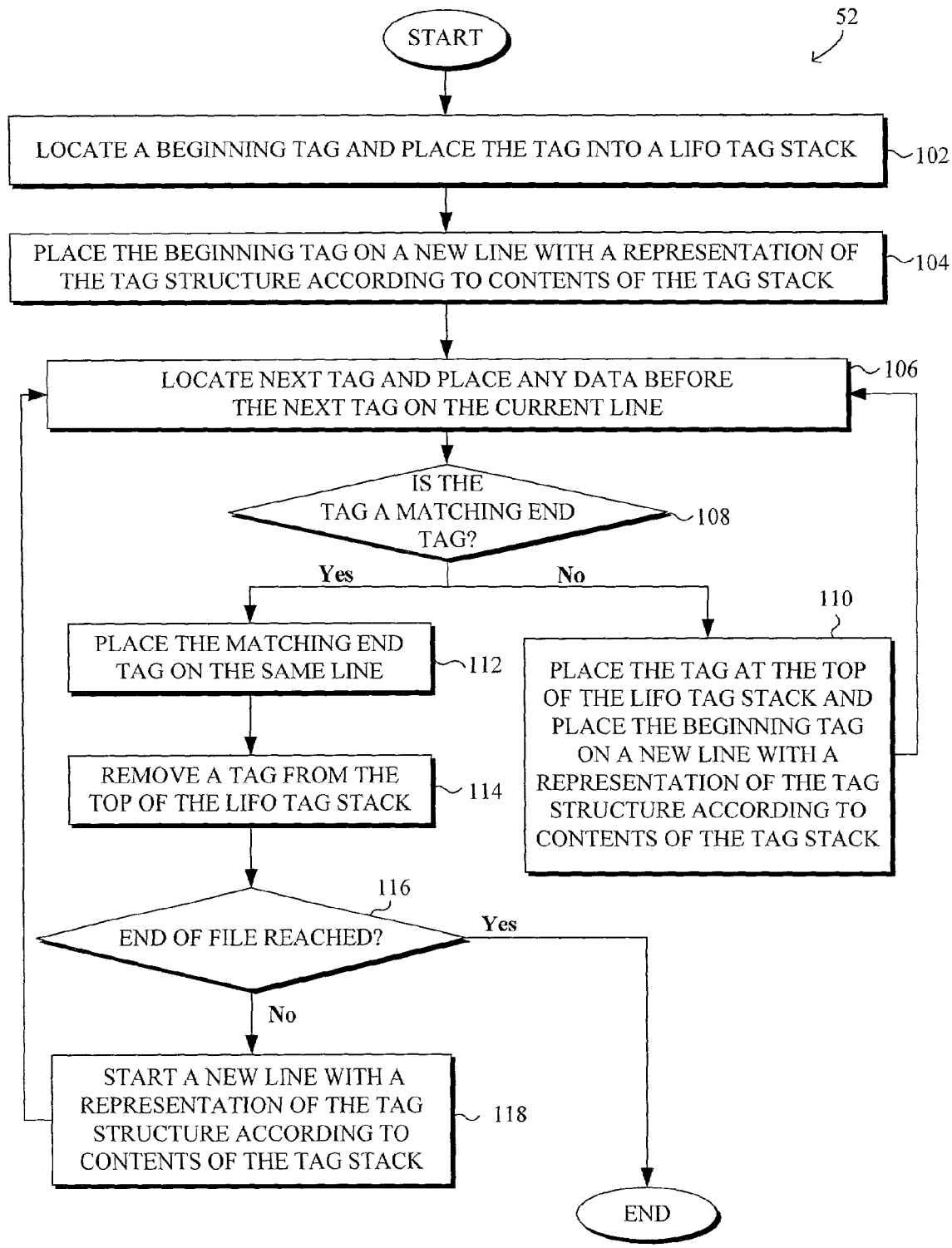
FIG. 2 is a flowchart illustrating an exemplary process for generating new reformatted code from tag-based code suitable for use by script tools.

FIG. 2 is a flowchart illustrating an exemplary process 52 for generating new code from tag-based code suitable for use by script tools. Process 52 essentially reformats the original tag-based code into a line-based code. In particular, at step 102, the process locates a beginning tag and places the beginning tag into a LIFO (Last In First Out) tag stack. Although a LIFO tag stack is referred to and utilized in the exemplary process illustrated and described with reference to FIG. 2, it is to be understood that any suitable state machine may be utilized and implemented.

At step 104, the process places the located beginning tag on a new line with a representation of the tag structure according to contents of the tag stack. At this point, the LIFO tag stack contains only one tag, namely the beginning tag located at step 104. In addition, as noted above, the representation of the tag structure is preferably a prefix for the new line.

At step 106, the process locates a next tag and places any data before the next tag on the current line along with the beginning tag and the corresponding representation of the tag structure already contained in the current line. At step 108, the process determines whether the newly located tag is an end tag, i.e., one that matches the most recently located beginning tag located at the top of the LIFO tag stack. It is noted that in the exemplary process 52 shown in FIG. 2, it is assumed that every beginning tag has a corresponding end tag properly located within the original code. In other words, it is assumed that a located end tag matches or corresponds with a beginning tag located at the top of the LIFO tag stack. As is evident to one of ordinary skill in the art, the process may be modified to perform a verification that each located end tag does indeed match a beginning tag located at the top of the LIFO tag stack and to throw an exception if the result is false.

If the process determines that the newly located tag is not an end tag, then the newly located tag is a beginning tag. Thus, at step 110, the process places the beginning tag at the top of the LIFO tag stack and places the beginning tag on a new line with a representation of the tag structure according to contents of the tag stack. The process then returns to step 106 to locate the next tag.

Alternatively, if the process determines that the newly located tag is an end tag, then at step 112, the process places the matching end tag on the same line. At step 114, the process removes the corresponding beginning tag from the top of the LIFO tag stack.

Next, at step 116, the process determines if the end of the file is reached. If so, then the process 52 is complete. Alternatively, if the end of the file is not reached, then at step 118, the process starts a new line with a representation of the tag structure according to contents of the tag stack and then returns to step 106 to locate the next tag.

It is noted that process 52 may be modified in any suitable manner to result in similar modified code. For example, the process may first split up the original tag-based code into appropriate lines in a first process and then prefix each line with a representation of the tag structure in a second, separate process.

As is known in the art, a tag-based code may contain numerous beginning and end tag pairs including any number of embedded beginning and end tag pairs. The embedded tag pairs may be embedded one or several tags deep. The level of embedding is maintained or otherwise tracked by the process with the use of the LIFO tag stack or any other suitable state machine. Thus, as is evident, the content of the LIFO tag stack when a beginning or an end tag is processed determines the level that the tag is embedded. In other words, the further a tag is embedded, the more beginning tags there are stored in the LIFO tag stack.

As discussed above, the process places a representation of the tag structure on each line according to contents of the LIFO tag stack. In one preferred embodiment, the process may simply concatenate all the tags in the LIFO tag stack each time it generates a representation of the tag structure. In particular, if the LIFO tag stack contains "tag1" and "tag2", the process may prefix the line with, for example, "tag1_tag2" or "tag1–tag2."

FIGS. 3A–3B are tables illustrating an exemplary tag-based code and a code modified utilizing the process of FIG. 2. As shown in the table of FIG. 3A, the original tag-based code contains various tags, some of which are embedded within one or more beginning-end tag pairs. FIG. 3B is a table illustrating a line-based modified or reformatted code that contains a structured grouping of the tag structure of the original code. In particular, each line of the modified code contains a prefix that specifies the tag structure of the element for the given line.

Specifically, the tag structure for line 1 includes only tag1 and thus the prefix for line 1 contains only "tag1." With respect to line 2, tag2 is embedded within tag1 and thus the tag structure for line 2 is tag1 and tag2, in which tag2 is located at the top of the LIFO tag stack above tag1. Note that after the element for line 2 is processed, tag2 is removed from the LIFO tag stack such that the tag structure for line 3 is simply tag1. In addition, line 3 contains only data for tag 1 but does not itself contain a beginning or end tag as it is between an end tag2 and a beginning tag3, with which the tag1 data is not associated.

Line 5 contains the tag structure and data for tag4. Because tag4 is embedded within tag3 which is in turn embedded in tag1, the LIFO tag stack contains, in ascending order, tag1, tag3, and tag4. Thus, the tag structure for line 5 includes tag1, tag3, and tag4. Lastly, with respect to line 7, after data "yet more tag1 data" and end tag for tag1, i.e., "<tag1>," are processed, tag1 is removed from the LIFO tag stack such that the LIFO tag stack becomes empty as the process reaches the end of the original code file.

As illustrated in FIG. 3B, the process places each beginning tag and any data immediately after the beginning tag and but prior to a next beginning tag, if any, on a new line, as is the case for lines 1, 2, 4, and 5. In addition, the process places an end tag on a same line as any data associated with the tag that appear immediately prior to the end tag, as is the case for lines 2, 5, 6, and 7. Furthermore, each time an end tag is processed, a new line is initiated if the end of the file is not yet reached.

As noted above, prefixing each line in the new file with a representation of the tag structure allows script tools to easily find the tag blocks. For example, with respect to the newly generated lines shown in the table of FIG. 3B, a UNIX "grep" command for "tag3" would return the text of lines 4, 5, and 6, namely, only the data of tag3. Similarly, a "grep" command for "tag2" or "tag4" would return the text of lines 2 or 5, namely, only the data of tag2 or tag4, respectively. Furthermore, a "grep" command for "tag1" would produce the text of lines 1–7, namely, all the data of tag1

Figure 4:
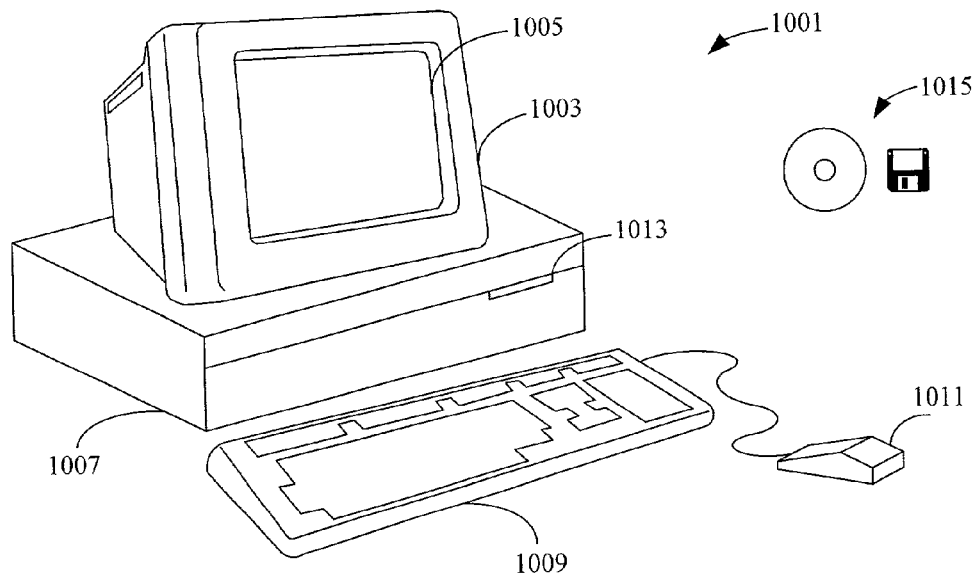
FIG. 4 illustrates an example of a computer system that can be utilized with the various embodiments of method and processing described herein.
Figure 5:
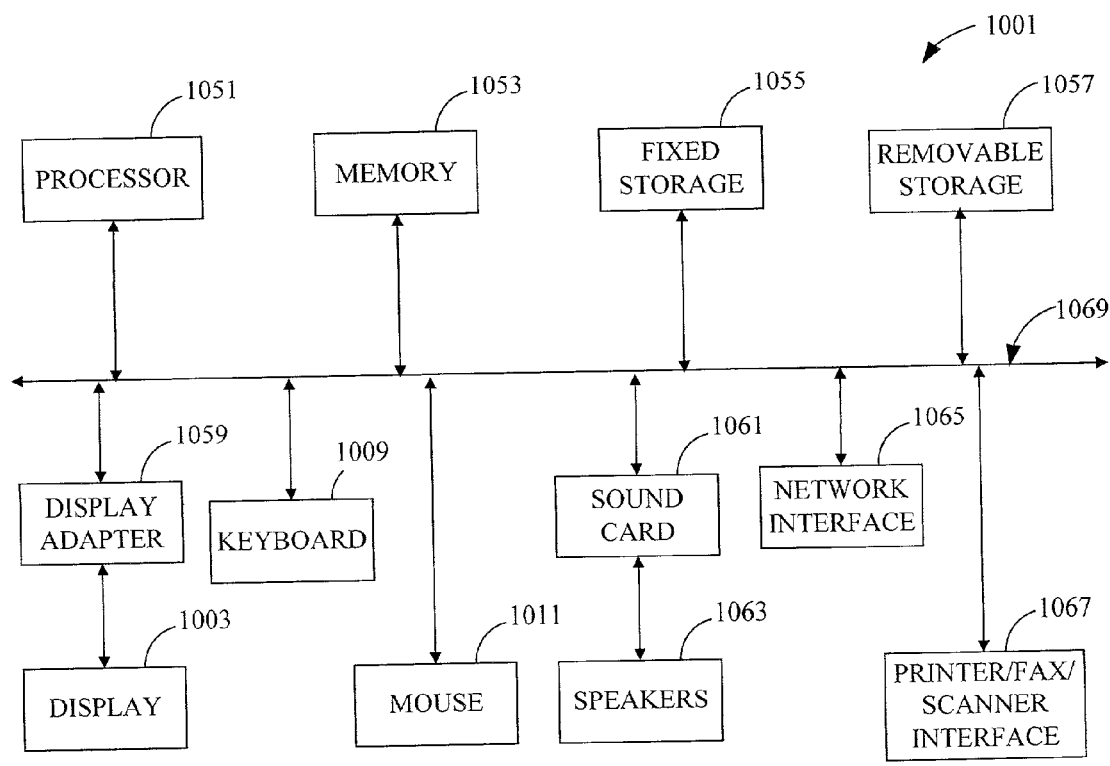
FIG. 5 illustrates a system block diagram of the computer system of FIG. 4.

FIGS. 4 and 5 illustrate a schematic and a block diagram, respectively, of an example of a general purpose computer system 1000 suitable for executing software programs that implement the methods and processes described herein. The architecture and configuration of the computer system 1000 shown and described herein are merely illustrative and other computer system architectures and configurations may also be utilized.

The illustrative computer system 1000 includes a display 1003, a screen 1005, a cabinet 1007, a keyboard 1009, and a mouse 1011. The mouse 1011 can have one or more buttons for interacting with a GUI (graphical user interface) that may be displayed on the screen 1005. The cabinet 1007 typically house one or more drives to read a computer readable storage medium 1015, system memory 1053, and a hard drive 1055, any combination of which can be utilized to store and/or retrieve software programs incorporating computer codes that implement the methods and processes described herein and/or data for use with the software programs, for example. Examples of computer or program code include machine code, as produced, for example, by a compiler, or files containing higher level code that may be executed using an interpreter.

Computer readable media may store program code for performing various computer-implemented operations and may be encompassed as computer storage products. Although a CD-ROM and a floppy disk 1015 are shown as exemplary computer readable storage media readable by a corresponding CD-ROM or floppy disk drive 1013, any other combination of computer readable storage media can be utilized. Computer readable medium typically refers to any data storage device that can store data readable by a computer system. Examples of computer readable storage media include tape, flash memory, system memory, and hard drive may alternatively or additionally be utilized. Computer readable storage media may be categorized as magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. Further, computer readable storage medium may also encompass data signals embodied in a carrier wave, such as the data signals embodied in a carrier wave carried in a network. Such a network may be an intranet within a corporate or other environment, the Internet, or any network of a plurality of coupled computers such that the computer readable code may be stored and executed in a distributed fashion.

Computer system 1000 comprises various subsystems. The subsystems of the computer system 1000 may generally include a microprocessor 1051, system memory 1053, fixed storage 1055 (such as a hard drive), removable storage 1057 (such as a CD-ROM drive), display adapter 1059, sound card 1061, transducers 1063 (such as speakers and microphones), network interface 1065, and/or scanner interface 1067.

The microprocessor subsystem 1051 is also referred to as a CPU (central processing unit). The CPU 1051 can be implemented by a single-chip processor or by multiple processors. The CPU 1051 is a general purpose digital processor which controls the operation of the computer system 1000. Using instructions retrieved from memory, the CPU 1051 controls the reception and manipulation of input data as well as the output and display of data on output devices.

The network interface 1065 allows CPU 1051 to be coupled to another computer, computer network, or telecommunications network using a network connection. The CPU 1051 may receive and/or send information via the network interface 1065. Such information may include data objects, program instructions, output information destined to another network. An interface card or similar device and appropriate software implemented by CPU 1051 can be used to connect the computer system 1000 to an external network and transfer data according to standard protocols. In other words, methods and processes described herein may be executed solely upon CPU 1051 and/or may be performed across a network such as the Internet, intranet networks, or LANs (local area networks), in conjunction with a remote CPU that shares a portion of the processing. Additional mass storage devices (not shown) may also be connected to CPU 1051 via the network interface 1065.

The subsystems described herein are merely illustrative of the subsystems of a typical computer system and any other suitable combination of subsystems may be implemented and utilized. For example, another computer system may also include a cache memory and/or additional processors 1051, such as in a multi-processor computer system.

The computer system 1000 also includes a system bus 1069. However, the specific buses shown are merely illustrative of any interconnection scheme serving to link the various subsystems. For example, a local bus can be utilized to connect the central processor to the system memory and display adapter.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A method for reformatting a tag-based code containing at least one corresponding beginning and end tag pair, comprising;
    locating each beginning and end tag of the tag-based code;
    separating distinct tags and data associated therewith into separate lines;
    maintaining a tag structure state machine for determining a tag structure corresponding to each line; and
    delineating each line with a representation of a tag structure corresponding to the line based on the tag structure state machine;
    wherein said separating distinct tags and data associated therewith into separate lines includes:
    placing each beginning tag and any data associated therewith prior to a next beginning tag, if any, on a new line;
    placing each end tag on a same line as any data associated therewith located immediately before the end tag; and
    initiating a new line each time an end tag is processed if the end of the file is not yet reached;
    wherein line-based script tools are utilized to process the reformatted code;
    wherein a particular line includes an embedded tag that is embedded within another tag, where the representation of the tag structure corresponding to the particular line includes the embedded tag and the other tag, and the embedded tag is located at a top of a LIFO tag stack above the other tag.

2. The method for reformatting a tag-based code of claim 1, wherein said maintaining the tag structure state machine includes maintaining the LIFO tag stack.

3. The method for reformatting a tag-based code of claim 2, wherein said maintaining the tag structure state machine includes inserting each beginning tag onto the LIFO tag stack upon locating the beginning tag.

4. The method for reformatting a tag-based code of claim 2, wherein said maintaining the tag structure state machine includes removing a beginning tag from the LIFO tag stack upon locating a corresponding end tag.

5. The method for reformatting a tag-based code of claim 1, wherein said delineating each line with a representation of a tag structure corresponding to the line based on the tag structure state machine includes prefixing each line with said representation.

6. The method for reformatting a tag-based code of claim 1 wherein said tag-based code is selected from the group consisting of HTML, XML, and C.

7. A computer program product for reformatting a tag-based code containing at least one corresponding beginning and end tag pair, comprising:
    computer code that locates each beginning and end tag of the tag-based code;
    computer code that separates distinct tags and data associated therewith into separate lines;
    computer code that maintains a tag structure state machine for determining a tag structure corresponding to each line;
    computer code that delineates each line with a representation of a tag structure corresponding to the line based on the tag structure state machine; and
    a tangible computer readable medium that stores said computer codes;
    wherein the computer code that separates distinct tags and data associated therewith into separate lines includes:
    computer code that places each beginning tag and any data associated therewith prior to a next beginning tag, if any, on a new line;
    computer code that places each end tag on a same line as any data associated therewith located immediately before the end tag; and
    computer code that initiates a new line each time an end tag is processed if the end of the file is not yet reached;
    wherein line-based script tools are utilized to process the reformatted code;
    wherein a particular line includes an embedded tag that is embedded within another tag, where the representation of the tag structure corresponding to the particular line includes the embedded tag and the other tag, and the embedded tag is located at a top of a LIFO tag stack above the other tag.

8. The computer program product of claim 7, wherein the computer code that maintains the tag structure state machine includes computer code that maintains the LIFO tag stack.

9. The computer program product of claim 8, wherein the computer code that maintains the tag structure state machine includes computer code that inserts each beginning tag onto the LIFO tag stack upon locating the beginning tag.

10. The computer program product of claim 8, wherein the computer code that maintains the tag structure state machine includes computer code that removes a beginning tag from the LIFO tag stack upon locating a corresponding end tag.

11. The computer program product of claim 7, wherein the computer code that delineates each line with a representation of a tag structure corresponding to the line based on the tag structure state machine includes computer code that prefixes each line with said representation.

12. The computer program product of claim 7, wherein said tag-based code is selected from the group consisting of HTML, XML, and C.

13. A method for processing a tag-based code containing at least one corresponding beginning and end tag pair using script tools, comprising:

reformatting the tag-based code; and
utilizing script tools to process the reformatted code,
wherein said reformatting includes:
- locating each beginning and end tag of the tag-based code;
- separating distinct tags and data associated therewith into separate lines;
- maintaining a tag structure state machine for determining a tag structure corresponding to each line; and
- delineating each line with a representation of a tag structure corresponding to the line based on the tag structure state machine;

wherein said separating distinct tags and data associated therewith into separate lines includes:
- placing each beginning tag and any data associated therewith prior to a next beginning tag, if any, on a new line;
- placing each end tag on a same line as any data associated therewith located immediately before the end tag; and
- initiating a new line each time an end tag is processed if the end of the file is not yet reached;

wherein line-based script tools are utilized to process the reformatted code;

wherein a particular line includes an embedded tag that is embedded within another tag, where the representation of the tag structure corresponding to the particular line includes the embedded tag and the other tag, and the embedded tag is located at a top of a LIFO tag stack above the other tag.

14. The method for processing a tag-based code of claim 13, further comprising stripping each line of the processed and reformatted code of the delineation representing the tag structure corresponding to the line.

* * * * *

UNITED STATES PATENT AND TRADEMARK OFFICE
CERTIFICATE OF CORRECTION

| | | |
|---|---|---|
| PATENT NO. | : 6,959,418 B1 | Page 1 of 1 |
| APPLICATION NO. | : 09/894693 | |
| DATED | : October 25, 2005 | |
| INVENTOR(S) | : Churchyard | |

It is certified that error appears in the above-identified patent and that said Letters Patent is hereby corrected as shown below:

In the claims:
col. 8, line 23, delete "tangible".

Signed and Sealed this
Eighteenth Day of January, 2011

David J. Kappos
*Director of the United States Patent and Trademark Office*